United States Patent [19]

Ishikura et al.

[11] Patent Number: 4,756,375
[45] Date of Patent: Jul. 12, 1988

[54] MOTOR-DRIVEN POWER STEERING APPARATUS

[75] Inventors: Hisatugu Ishikura; Nobuyoshi Onuma; Shigeki Saito; Hiroyosi Sakurai, all of Katsuta, Japan

[73] Assignees: Hitachi, Ltd.; Hitachi Automotive Engineering Co., Ltd., both of Tokyo, Japan

[21] Appl. No.: 870,751

[22] Filed: Jun. 4, 1986

[30] Foreign Application Priority Data

Jun. 12, 1985 [JP] Japan .................. 60-126100

[51] Int. Cl.⁴ ............................. B62D 5/04
[52] U.S. Cl. ..................... 180/79.1; 318/139; 318/488; 318/489
[58] Field of Search .......... 180/79.1, 79.3, 79, 180/133, 141, 142, 143; 318/432, 433, 139, 488, 489

[56] References Cited

U.S. PATENT DOCUMENTS

| | | | |
|---|---|---|---|
| 4,416,345 | 11/1983 | Barthelemy | 180/79.1 |
| 4,532,567 | 7/1985 | Kade | 180/79.1 X |
| 4,538,698 | 9/1985 | Hashimoto et al. | 180/79.1 |
| 4,624,334 | 11/1986 | Kelledes et al. | 180/79.1 |
| 4,624,335 | 11/1986 | Shiraishi et al. | 180/79.1 X |
| 4,639,651 | 1/1987 | Shimizu | 318/489 X |
| 4,653,601 | 3/1987 | Nakamura et al. | 180/79.1 |

FOREIGN PATENT DOCUMENTS

| | | | |
|---|---|---|---|
| 81758 | 6/1983 | European Pat. Off. | 180/132 |
| 11965 | 1/1984 | Japan | 180/79.1 |
| 38168 | 3/1984 | Japan | 180/133 |
| 223561 | 12/1984 | Japan | 180/79.1 |
| 146760 | 8/1985 | Japan | 180/79.1 |
| 197464 | 10/1985 | Japan | 318/489 |
| 2166099 | 10/1985 | United Kingdom . | |
| 2177358 | 1/1987 | United Kingdom | 180/79.1 |

Primary Examiner—David M. Mitchell
Assistant Examiner—Mitchell J. Hill
Attorney, Agent, or Firm—Antonelli, Terry & Wands

[57] ABSTRACT

The present invention provides a controller for a power steering control system with a current limiter for limiting current to be fed to a power steering motor, in accordance with a power source voltage, whereby the power source is prevented from falling into an overdischarge state while a power steering function is performed. An additional feature of the present invention is an idle speed control device for increasing the engine idle speed when the current of the power steering motor reaches a predefined level.

8 Claims, 5 Drawing Sheets

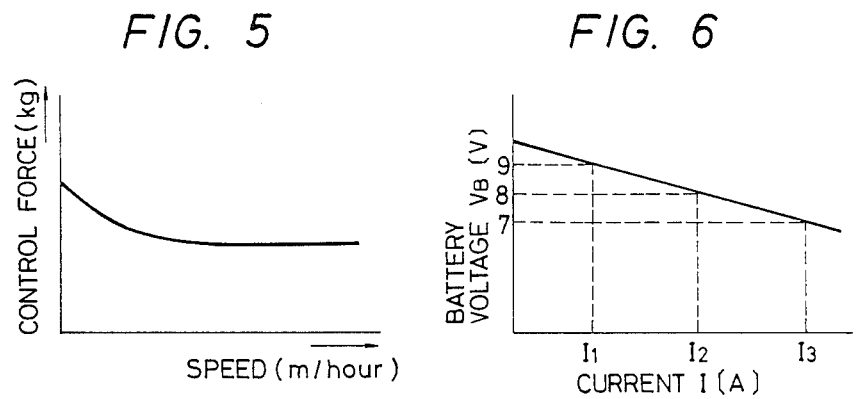
FIG. 5
FIG. 6
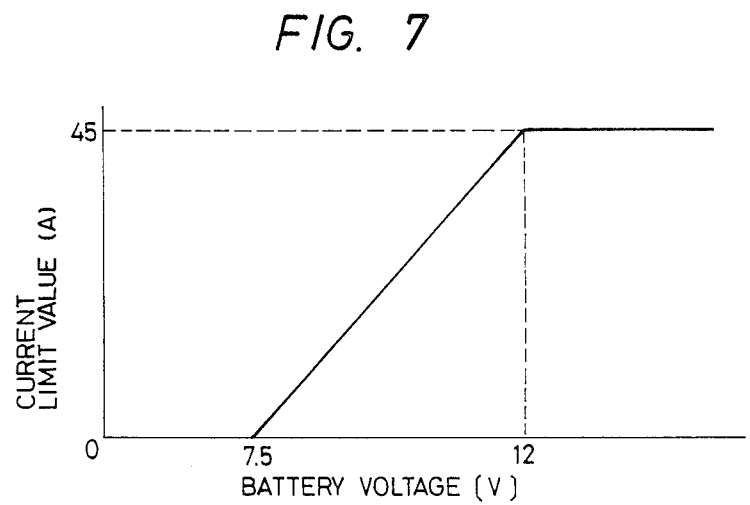
FIG. 7

MOTOR-DRIVEN POWER STEERING APPARATUS

FIELD OF THE INVENTION

The present invention relates to a motor-driven power steering apparatus for automobiles, and more particularly to a motor-driven power steering apparatus based on a current limiting system which is well suited to prevent the overdischarge of a battery.

BACKGROUND OF THE INVENTION

A power steering apparatus for automobiles having heretofore been known is the so-called electrohydraulic type wherein as in, for example, a "motor-driven power steering apparatus" disclosed in the official gazette of Japanese Patent Application Laid-Open No. 59-223561 laid open on Dec. 15, 1984, an oil pump is driven by a motor, and the hydraulic pressure thereof is utilized to assist in the control force of a steering wheel. Such an electro-hydraulic type power steering apparatus is so constructed that electric power to the motor is cut off in the overdischarge state of a battery. In a case where a car is running along, e.g., a curve especially at a high speed, the construction is attended with the risk that the steering wheel will work improperly to return to its neutral position for a moment. It has not been considered at all that the battery is prevented from falling into the overdischarge state while the power steering function is held satisfactory.

This is conspicuous especially in cars furnished with power steering apparatuses of the so-called motor-driven type which are intended to assist in the steering operation directly with motor power, and incurs such a drawback that headlamps darken due to the overdischarge.

SUMMARY OF THE INVENTION

An object of the present invention is to provide a motor-driven power steering apparatus which is suited to prevent the overdischarge of the power source thereof while solving problems attributed to the lowering of the voltage of the power source.

In order to accomplish the object, the present invention limits current to be fed to the motor of the motor-driven power steering apparatus, according to a power source voltage, whereby the power source voltage is ensured to be at least a predetermined value.

BRIEF DESCRIPTION OF THE DRAWINGS

FIG. 5 shows a car speed-control force characteristic.

FIG. 6 shows the drooping characteristic of a battery.

FIG. 7 shows the characteristic of a pattern control based on a current limiting value versus a battery voltage.

DETAILED DESCRIPTION OF THE PREFERRED EMBODIMENTS

Figure 1:
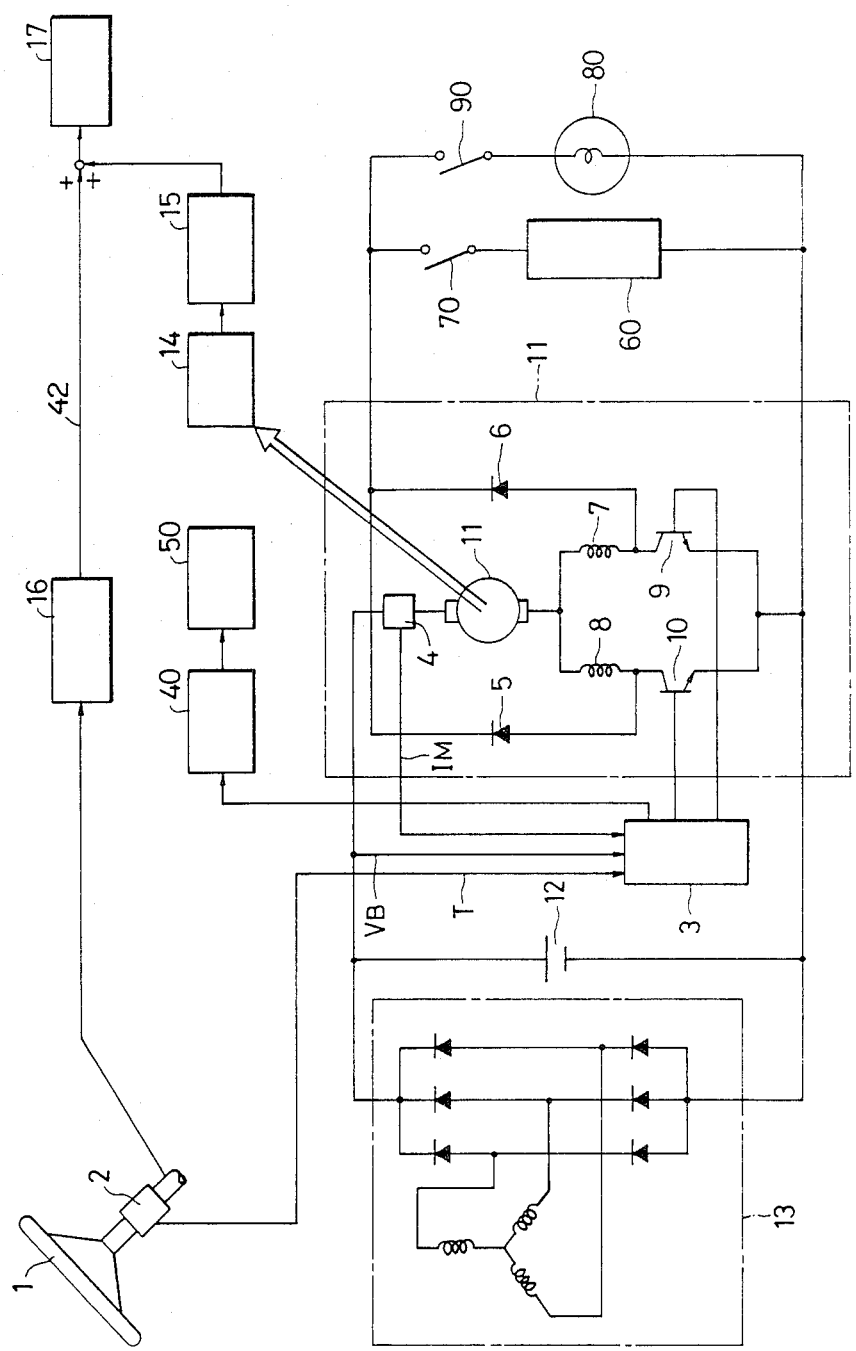
FIG. 1 is a general arrangement diagram of a motor-driven power steering apparatus according to the present invention.

Referring to FIG. 1, during an ordinary steering operation, a controlling ability by a steering wheel 1 is detected by a torque sensor 2 as a control torque, which is applied to a controller 3. This controller is constructed of a microcomputer. The controller 3 supplies a motor 11 with an output signal corresponding to the detection signal of the torque sensor 2, whereupon the motor 11 transmits a required torque to reduction gears 15 through a clutch 14 thereby to assist in the control force of the steering wheel 1.

Here, the motor 11 is a series-wound D.C. motor having a field winding for clockwise rotation 7 and a field winding for anticlockwise rotation 8, which are selected by power transistors 9 and 10 that are controlled by the signal from the controller 3. Further, a current sensor 4 for detecting current flowing through the motor is provided.

A power source for driving the motor is a battery 12 which is carried on a car, and which is charged by the alternator 13 of an A.C. generator that is driven to roate by an engine. In addition to the motor 11, a headlamp 80 and another load 60 are connected in parallel with a battery 12 through switches 90 and 70 respectively.

Owing to the above construction, tires 17 are given a steering angle by the resultant forces of a force the control force of the steering wheel 1 transmitted through a steering wheel shift 41 a steering gear 16 and a tire driving shaft 42 and a force transmitted through the reduction gears 15 from the motor 11. Accordingly, insofar as the torque sensor 2 detects the torque, the motor 11 generates the necessary torque and assists in the control force.

Figure 2:
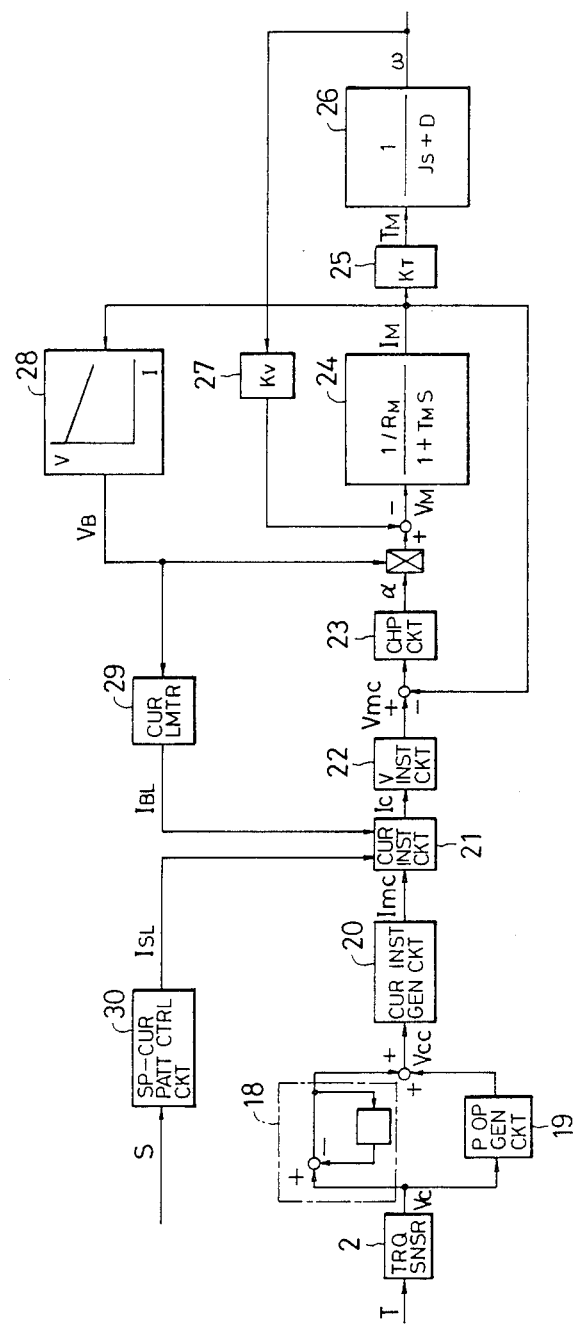
FIG. 2 is a block diagram of a motor as well as a controller.

Next, a practicable embodiment will be described as to the motor 11 as well as the controller 3 with reference to a block diagram in FIG. 2. In FIG. 2, elements 24-27 are considered to be representative of the motor with element 28 being representative of the battery and elements 21 and 29 being representative of the controller of FIG. 1, for example, as described below.

On the basis of a control torque T exerted on the steering wheel 1 shown in FIG. 1, the torque sensor 2 delivers a signal $V_c$. The combined value $V_{cc}$ between an output from a proportional output generator circuit 19 generating the output proportional to the torque sensor signal $V_c$ and an output from a differential output generator circuit 18 generating the differential value of the signal $V_c$ is applied to a current instruction generator circuit 20, whereby a current instruction $I_{mc}$ based on the control torque T is determined.

On the other hand, a current limiting value $I_{SL}$ is determined by a speed-current pattern control circuit 30 on the basis of a car speed S. Further, a current instruction $I_c$ is determined by a circuit 21 in accordance with the signals $I_{mc}$ and $I_{SL}$. This current instruction $I_c$ is converted into an instruction voltage $V_{mc}$ by a voltage instruction circuit 22.

Subsequently, a current actually flowing through the motor 11 is fed back to the instruction voltage $V_{mc}$, and the resulting difference is applied to a chopper circuit 23 to determine a chopper duty factor $\alpha$. The product between the duty factor $\alpha$ and a battery voltage $V_B$ becomes an input voltage $V_M$ to the motor 11. The input voltage $V_M$ turns into a motor current $I_M$ in accordance with a transfer function 24 indicated by $$\frac{1/R_M}{1 + T_M s}$$

where $R_M$ denotes a motor resistance and $T_M$ a motor time constant, and a motor torque $T_M$ is generated in accordance with a torque coefficient $K_T$ indicated at numeral 25. The motor torque $T_M$ generates a motor angular velocity $\omega$ which is determined by a transfer function 26 expressed as $$\frac{1}{Js + D}$$

where J denotes the moment of inertia of the motor and D the coefficient of viscosity thereof. In addition, the product of the motor angular velocity $\omega$ with a counter electromotive force coefficient 27 indicated by $K_v$ is fed back to the motor input voltage $V_M$. The controller 3 and the motor 11 are constructed as thus far described.

Figure 4:
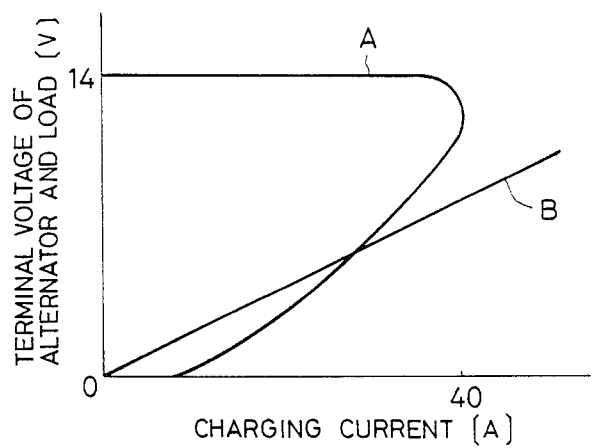
FIG. 4 shows the terminal voltage-charging current characteristics of an alternator and a load.

As a feature of the power steering, there is a relationship between a control force and a car speed illustrated in FIG. 5. It is seen from the figure that a great control force is required especially when the speed is zero as in the turning of the steering wheel at a stop. Accordingly, a great current is necessary for the motor 11 in the turning of the steering wheel under the stopped state. In addition, where the steering wheel is fully turned clockwise or counterclockwise with the car stopped and where a wheel holding torque is kept applied, or where the steering wheel is maintained under the maximum torque state (for example, when a car body having fallen into a ditch is to be brought out of the ditch), a large current reaching a current limit value (for example, 50 amps) is needed, and large amounts of power is consumed. Moreover, during such a mode of the wheel turning with the car stopped the engine is usually in an idling state, and the charging capability of the alternator 13 is low. The relationship between the terminal voltage of the alternator 13 and the charging current thereof is as shown by a curve A in FIG. 4. When an electric load such as the motor-driven power steering apparatus is added, both the charging current and the terminal voltage lower as shown by a curve B in FIG. 4. On account of such circumstances, with the motor-driven power steering apparatus in the prior art, the overdischarge of the battery proceeds to incur problems in practical use and in safety. For example, the starting of the engine is hampered, the headlights darken and other auxiliaries do not operate normally, and the controller may malfunction. Here, as conventional electric loads, even headlights require about 15 amps, whereas the motor-driven power steering apparatus requires a large current of 50 amps in terms of the maximum current. Accordingly, in the car furnished with the motor-driven power steering apparatus, securing the voltage of the battery 12 is particularly important and a desired improvement to the art.

Figure 3:
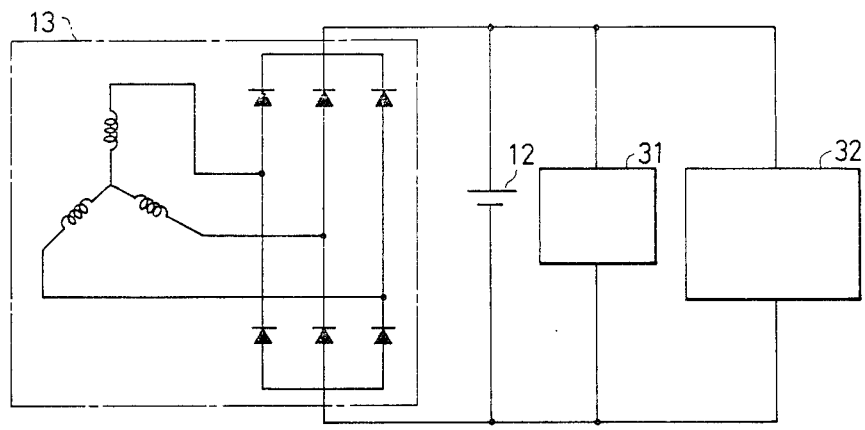
FIG. 3 is an explanatory diagram of feeder lines.

In the present invention, to secure the voltage, the voltage of the any part of feeder lines is detected, and the current of the motor 11 is limited in accordance with the detected value. Here, the feeder lines are portions indicated by solid lines in FIG. 3, and both the positive side and the negative side are the feeder lines. By way of example, there will be explained a case where the voltage detection is performed at battery terminals in the feeder lines.

FIG. 6 shows the drooping characteristic of the voltage of the battery in the motor-driven power steering apparatus of the present embodiment. As illustrated in this figure, when the overdischarge of the battery proceeds, the battery terminal voltage sometimes lowers below 7 volts. According to FIG. 6, even if the voltage is $V_B = 7$ volts at a current $I_3$ amps, it is recovered to $V_B = 9$ volts by lowering the current to $I_1$ amps. In the present invention, on the basis of such a phenomenon peculiar to the battery, the current is limited, more concretely, the current limit value in the control circuit is lowered, thereby intending to secure the battery voltage and to provide a motor-driven power steering apparatus well suited thereto.

As a system for these purposes, the so-called pattern control which is based on the current limit value corresponding to the battery voltage as shown in FIG. 7 by way of example is adopted. Concretely, it is a method in which the battery voltage is detected, whereupon the current limit value is set in correspondence with the detected value. For example, when the battery voltage is $V_B = 10$ volts, the current limit value becomes 25 amps. In this case, the current to be fed to the motor is controlled within a range not higher than 28 amps. Further, in a case where the battery voltage has lowered below $V_B = 7.5$ volts, the motor current is cut off in order to prevent the overdischarge of the battery. Such a pattern control is carried out in such a way that the characteristic shown in FIG. 7 is stored in the ROM (read only memory) of the microcomputer which constructs the controller 3 it is read out.

When the battery 12 has been recovered above 12 volts again owing to such a pattern control of the motor current according to the battery voltage and also the charge of the battery 12 by the alternator 13, the motor 11 is controlled with the current limit value of 50 amps as usual.

Merely with such a pattern control, however, hunting is sometimes caused. The present embodiment further adopts a method in which the motor current is controlled by a feedback control so as to establish a set voltage.

Figure 8:
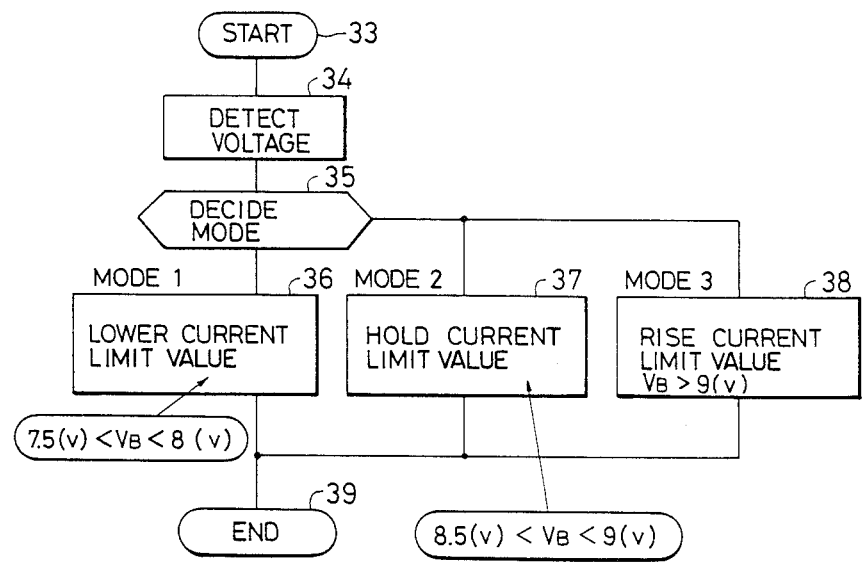
FIG. 8 is a flow chart of the current limiting value control according to the present invention.

The feedback control is concretely shown by a flow chart in FIG. 8. The flow chart shown in FIG. 8 is executed by a current limiter 29 shown in FIG. 2.

After the control has been started by a step 33 shown in FIG. 8, the terminal voltage of the battery 12 is detected at a step 34. A step 35 decides which of modes 1–3 the operation of the motor corresponds to.

Assuming now that the battery voltage $V_B$ to be absolutely secured be set at 7.5 volts, the motor current is inevitably cut off for $V_B < 7.5$ volts. The cutoff of the motor current, however, is problematic because the function of power steering is lost. Therefore, the battery voltage is prevented from becoming $V_B < 7.5$ volts. Further, $V_B = 8$ volts, $V_B = 8.5$ volts and $V_B = 9$ volts are set. In the range of 7.5 volts $< V_B < 8$ volts of mode 1 indicated at a step 36, the current limit value is lowered by 1.7 amps every 0.2 seconds. Here, the time and the current value are changed in small increments in order to lessen the impact incurred by the changes of the current limit value and are inflicted on the driver of the car. When, in consequence of the lowering of the current limit value, the battery voltage has recovered to the range of 8.5 volts $< V_B < 9$ volt of the mode 2 indicated at a step 37, the motor is controlled with the current limit value $I_{BL}$ amps at that point of time. Further, where the battery voltage $V_B$ has fallen into the range of $V_B>9$ volts of the mode 3 indicated by a step 37, in relation to the charge of the alternator, the current limit value is raised by 1.7 amps every 0.2 seconds conversely. In a case where the battery voltage is $V_B>12$ volts, the function of power steering is unconditionally demonstrated with the current limit value of 50 amps.

Meanwhile, the battery voltage $V_B$ lowers in accordance with the dropping characteristic shown in FIG. 6, in correspondence with the current $I_M$ flowing through the motor II which is driven by the battery 12.

As thus far described, according to the present invention, the current limiter 29 in FIG. 2 is added, whereby while the minimum function as the power steering apparatus is ensured, the overdischarge of the battery can be further prevented.

Figure 9:
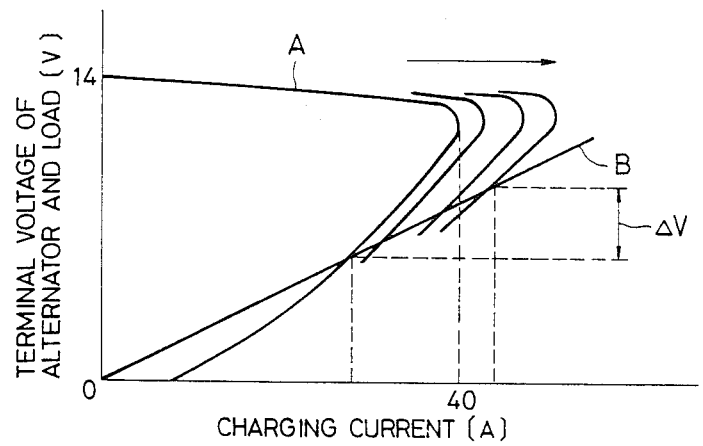
FIG. 9 shows the terminal voltage-charging current characteristics of the alternator and the load with a parameter being an idling speed.

Moreover, according to the present invention, in order to secure the voltage of the battery 12, a case where the motor current has reached the present current limit value (for example, 50 amps) is detected, and the detection signal is utilized as a control signal for promoting the generation of power by the alternator 13. That is, referring to FIG. 1, it is detected by the current sensor 4 that the motor current has reached the current limit value, and on the basis of the detection signal, an idling speed control device 50 is actuated through the controller 3 to raise the idling speed of the engine, whereby the charging capability of the alternator 13 is enhanced. FIG. 9 shows the relations between the terminal voltages of the alternator 13 and the load and the charging current of the alternator, in which curves A and B correspond to the alternator and the load respectively. As the idling speed increases, the characteristic of the terminal voltage of the alternator versus the charging current shifts in the direction of an arrow.

Since the driver may be surprised when the R. P. M. of the engine fluctuates in a short time in the present embodiment, the period of time for which the idling speed is increased is set at 3 minutes by utilizing a timer 40. In the present invention, the idling speed control device 50 is employed for the motor-driven power steering apparatus. Though it is not especially shown in detail, it is actuated to prevent the overdischarge of the battery when the current of the motor 11 has reached the current limit value. That is, the idling speed control device 50 increases the degree of opening of a throttle valve to augment the idling speed and to raise the rotating speed of the charging generator when the number of revolutions N of the alternator 13 is smaller than a present number of revolutions $N_o$ and besides the field current $I_f$ of the charging generator is greater than a preset current $I_{fo}$.

As described above, the battery voltage is protected by varying the current limit value, and further, when the motor current limit value has been reached, the idling speed of the engine is raised to promote charging by the alternator 13, whereby the overdischarge of the battery 12 can be prevented. According to the embodiment of the present invention, simultaneously with the limitation of the motor current, the R. P. M. of the engine can be raised to increase the charging capability of the alternator.

What we claim is:

1. A motor-driven power steering apparatus comprising:
   an electric motor which assists in a control force of a steering wheel of an automobile,
   clutch means to transmit a torque of the electric motor to a driving shaft for moving tires,
   a power source which feeds electric power to the electric motor, and
   a controller which controls the power fed to the electric motor and the operation of the clutch means in accordance with an output signal of a torque sensor for detecting a deviation between a steering wheel shaft driven by the steering wheel and the tire driving shaft said controller including voltage detecting means to detect a voltage valve of said power source, and current limiting means to limit the current to be fed to said electric motor based on the detected voltage value.

2. A motor-driven power steering apparatus according to claim 1, wherein the voltage detection means detects a terminal voltage of said power source.

3. A motor-driven power steering apparatus according to claim 1, wherein said controller subjects the current to be fed to said motor, to a pattern control in correspondence with said voltage value for driving said electric motor, thereby preventing overdischarge of the power source.

4. A motor-driven power steering apparatus according to claim 1, wherein the current limiting means comprises means for delivering a command for stopping said electric motor when the detected voltage value of the voltage detection means does not reach a first preset value.

5. A motor-driven power steering apparatus according to claim 4, wherein said means for delivering the command for stopping said electric motor comprises means for controlling a decreasing rate or increasing rate of a current limit value variably based on a magnitude of the detected voltage valve of said voltage detection means when the detected voltage valve increases fron the first preset value to a second preset normal voltage.

6. A motor-driven power steering apparatus according to claim 1, wherein said controller comprises a feedback control circuit which prevents overdischarge of the power source for driving said electric motor.

7. A motor-driven power steering apparatus according to claim 1, further comprising means for raising an idling speed of an engine of the automobile and to increase a charging capability of an alternator for charging the power source for driving said electric motor, when the current of said electric motor has reached a preset current limit value.

8. A motor-driven power steering apparatus according to claim 1, wherein said current limiting means limits the current to be fed to said electric motor based on the detected voltage value for preventing the voltage value of said power source from falling below a predetermined value.

* * * * *